Nov. 15, 1960   C. M. PERKINS   2,960,284
AUTOMATIC CONTROL APPARATUS FOR AIRCRAFT
Filed Jan. 11, 1957   4 Sheets-Sheet 4

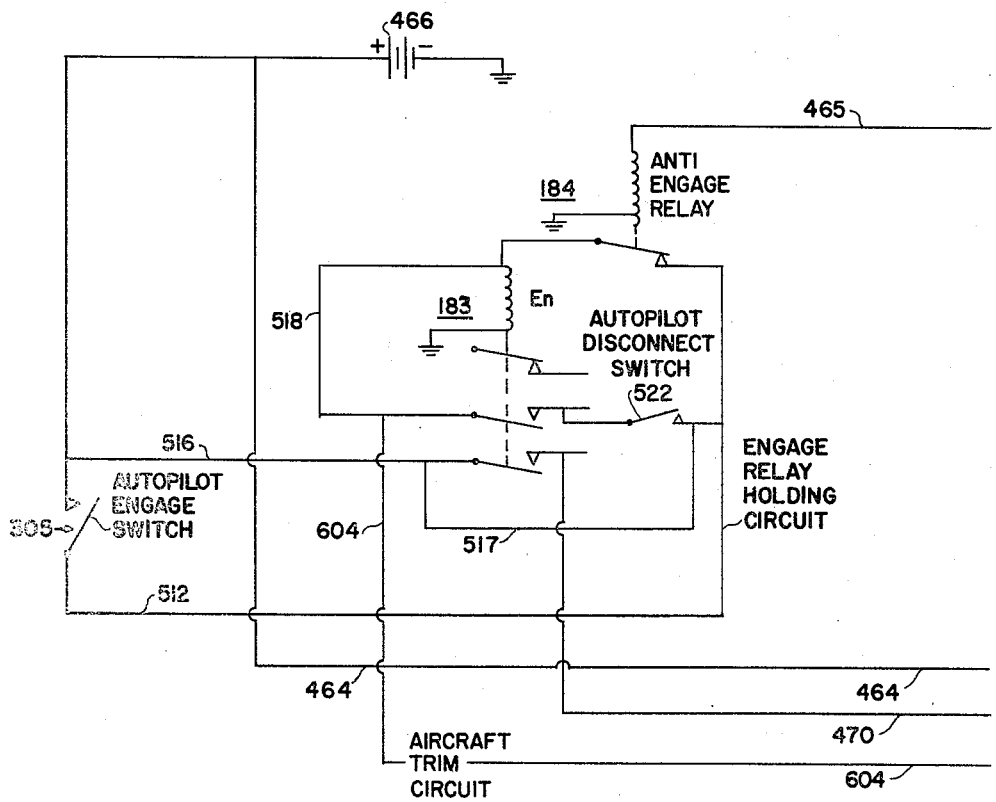
FIG IA

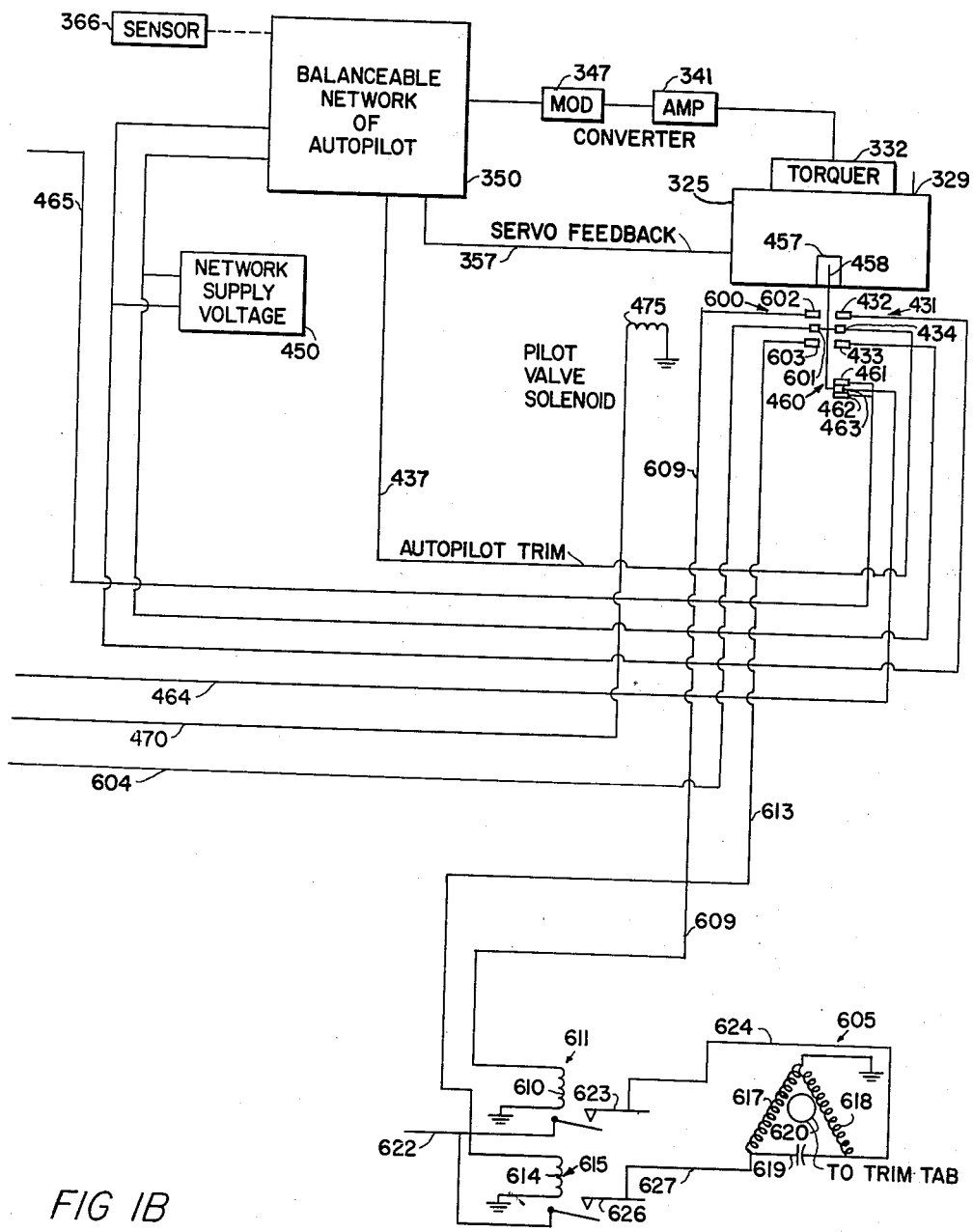

INVENTOR
CORLES M. PERKINS
BY
ATTORNEY

United States Patent Office 2,960,284
Patented Nov. 15, 1960

2,960,284

AUTOMATIC CONTROL APPARATUS FOR AIRCRAFT

Corles M. Perkins, Anoka, Minn., assignor to Minneapolis-Honeywell Regulator Company, Minneapolis, Minn., a corporation of Delaware Filed Jan. 11, 1957, Ser. No. 633,561

16 Claims. (Cl. 244—77)

The present invention relates to an apparatus for automatic control of a condition and more particularly relates to apparatus for effecting smooth automatic control of a dirigible craft in attitude.

It is an object of the present invention to provide an improved apparatus for the automatic control of the attitude of a dirigible craft.

Another object of the present invention is to provide an automatic control apparatus for effecting the movements of a craft in attitude in such manner as to avoid violent changes in craft attitude.

A further object of this invention is to minimize sustained loading on the servomotor operating the main surface when on automatic control to permit assumption of manual control without undue exertion.

A further object of this invention is to provide improved means in an automatic pilot apparatus for trimming the craft in flight by positioning the trim tab surface in response to sustained error signals developed in the automatic pilot.

A further object of this invention is to provide in an automatic pilot apparatus, a servomotor which functions to position the trim tab surface and also to utilize the same servomotor for enabling control of the craft operation through the autopilot to be shifted from one operation initiating device to another operation initiating device.

Another object of the present invention is to provide an automatic pilot apparatus for an aircraft having selective direct manual craft control provisions therein and wherein a transfer from such direct manual control of the craft to automatic pilot control may be effected without violent change of craft attitude and wherein also provisions are made to avoid abrupt deflection of the aircraft's attitude control member when changing from automatic pilot control to direct manual control.

Figure 2:
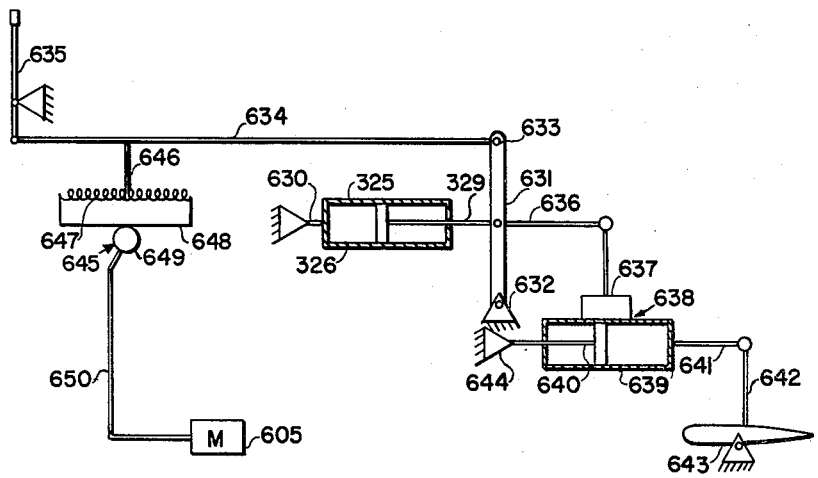
Figure 3:
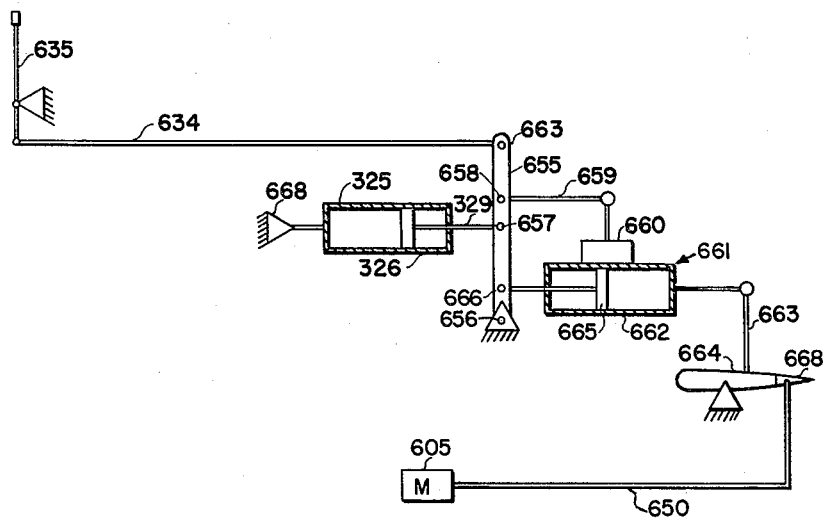
Figure 4:
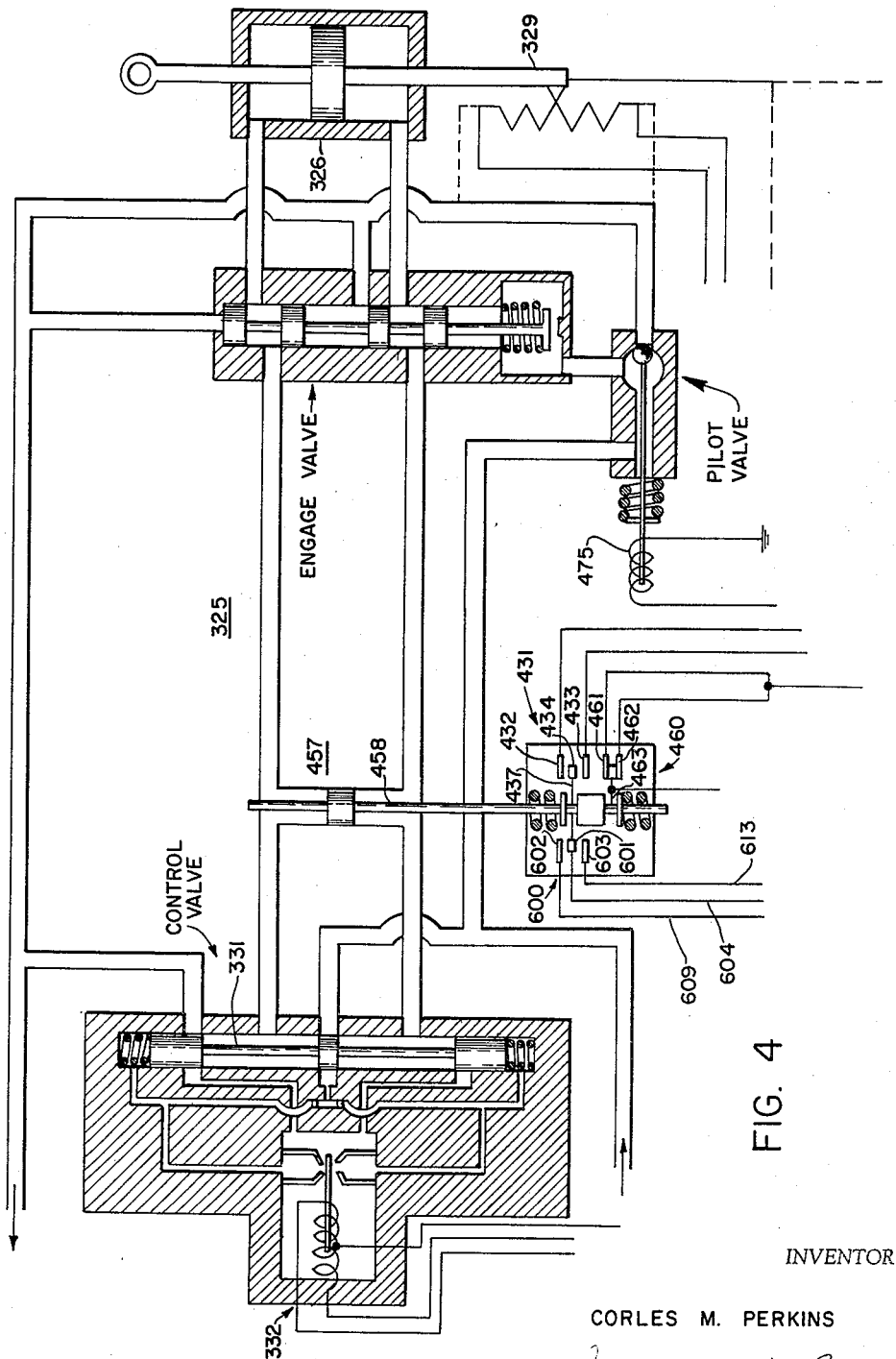

Other objects and advantages of the invention will become apparent from the specification taken in conjunction with the accompanying drawings, wherein:

Figures 1a and 1b schematically show an automatic pilot apparatus embodying the present invention and employed for controlling the pitch attitude of an aircraft; and Figure 2 illustrates the invention applied to the pilot feel system of an aircraft; and Figure 3 illustrates the invention applied to a trim tab surface of an aircraft. Figure 4 is a diagram of a hydraulic servomotor that controls the position of attitude changing means of the craft.

This application is a continuation in part of my prior application, Serial No. 553,131, filed December 14, 1955. The present invention relates primarily to the arrangement of Figures 3a and 3b of said prior application for controlling the elevator channel of an automatic pilot and particularly to the servomotor 325 thereof.

As in the prior application, a hydraulic servomotor 325, Figure 1b herein, includes a control valve 331 positioned by an electromagnetic torquer 332. The torquer in turn is energized from an A.C. discriminator amplifier 341 which receives control signals through a converter or modulator 347 from an autopilot network 350. The network 350 as is well known includes a plurality of potentiometers having resistors energized from a source of supply voltage 450. The potentiometers include sliders adjusted by various operating devices on the aircraft responsive to aircraft position or aircraft angular attitude rate such latter device being identified herein as sensor 366.

The control valve of servomotor 325 controls a trim actuator 457 which includes an operating rod 458 which coacts with two contact arrangements 431 and 460. The contact arrangement 431 which balances network 350 prior to engagement of the autopilot to the elevator comprises a pair of spaced contacts 432, 433 and a coacting operable contact 434 positioned by actuator piston rod 458. Extending from contact 434 is a conductor 437 connected to the network 350 to transmit the balancing signal. The operation of the contactor 434 as more fully explained in the prior application supplies an autopilot trim signal to the network 350. The contactor arrangement 460 associated with autopilot engage control comprises spaced contacts 461, 462 and an operable coacting contactor 463 positioned on piston rod 458 and operable thereby.

The servomotor 325 in addition to the trim actuator includes a pilot valve for the operating ram 329 and, the pilot valve has an energizing winding 475 for moving the pilot valve to open position thereby admitting fluid pressure to the ram in accordance with the operation of a torque operated control valve after the autopilot and elevator surface are operatively engaged. Rods 329 and 458 are thus operable in parallel by control valve 331.

Included in the aforesaid elevator channel is a single pole single throw normally closed antiengage relay 184, an engage relay 183 of the three pole type having one break and two make contacts; an engage switch 305, a source of voltage 466 an an elevator channel disconnect switch 522.

As more fully disclosed in my prior application, the elevator channel of the autopilot is considered to be operatively engaged with the elevator surface when the output member or ram 329 of the servomotor 325 is controlled during energization of the torquer 332. However, the torquer 332 may be energized without the elevator channel of the autopilot being so engaged. During such latter energization of torquer 332, the trim actuator piston rod 458 operates contactor 434 into engagement with contact 432 or 433 to supply a signal balancing autopilot network 350. When the network is thus balanced, energization of torquer 332 is terminated, and the piston rod 458 moves to its normal position wherein contactor 434 is intermediate spaced contacts 432 and 433.

Additionally, operation of the piston rod 458 causes contactor 463 to engage contact 461 or 462 to complete a circuit by way of battery 466 conductor 464 and conductor 465 to energize the operating winding of antiengage relay 184, Figure 1a. However, after network 350 is balanced as stated, the contactor 463 is moved intermediate contacts 461 and 462 whereby the antiengage relay is de-energized.

Thereafter, momentary closing of the engage switch 305 with the disconnect switch 522 also closed completes the autopilot engage circuit from source 466, switch 305 through the out contact of the anti-engage relay 184 to engage relay 183. With the engage relay 183 energized, a circuit is completed from battery 466, conductor 516, through one in contact of relay 183 and conductor 470 to energize the operating winding 475 of the servomotor pilot valve moving it to open position rendering the ram operable through the torquer operated control valve. Additionally, a holding circuit is provided for the operating winding of the engage relay 183 through energized conductor 516, conductor 517, switch 522, the other in or make contact of the relay and conductor 518.

Thereafter any unbalance of autopilot network 350, for example, from the craft responsive devices which causes energization of the torquer 332 results in the operation of the ram or servo output member 329 which is connected to the attitude control means of the aircraft. This attitude control means may include a boost servomotor (not shown) having a control valve positioned by output member 329.

The above mentioned features are all old in my prior application and reference may be made thereto for fuller details thereof. The matter not disclosed in my prior application but pertinent to this invention and newly disclosed herein is in providing a second contactor arrangement or airplane trim switch 600 having an operating member 601 fastened to actuator piston rod 458 and engageable with opposed contacts 602 and 603 which control a trim motor 605. Specifically, the operable contactor 601 is connected through conductor 604 to energized conductor 518 of the autopilot engage relay 183. Thus whenever the engage relay 183 is energized conductor 604 is energized. When arm 601 engages contact 602, while the engage relay 183 is energized, a circuit is completed from contact 602, conductor 609, through an operating winding 610 of a single pole single make relay 611, to ground. On the other hand when the operable contactor 601 engages contact 603 a circuit is completed through contact 603, conductor 613 through operating winding 614 of a single pole single make relay 615 to ground. Relays 611 and 615 control the trim motor 605.

The motor 605 may be a capacitative type conduction motor having operating windings 617, 618, and a phasing capacitor 619. The motor includes a rotor 620 which through a gear reduction may operate an output member to be more fully described hereinafter.

When the relay winding 610 is energized A.C. voltage from a bus 622 is supplied to the in contact 623 of relay 611 and thence through conductor 624 directly to motor winding 618 and additionally through phasing capacitor 619 and motor winding 617 to ground. When relay winding 614 is energized, A.C. voltage is supplied from bus 622, relay in contact 626, conductor 627 directly to motor windings 617 and through capacitor 619 to the second motor winding 618 and thence to ground to reversely control the motor 605.

It will be apparent as stated that the trim motor 605 can only be energized after the autopilot is engaged to drive the output member 329 of servo 325. The trim motor has various uses.

An arrangement wherein the motor 605 is utilized in connection with a stick feel system of the craft to prevent sudden movements of the control stick of the aircraft when changing from automatic control to manual control will be considered with reference to Figure 2. In Figure 2, a cylinder assembly 326 of the power section of servomotor 325 of my prior application is connected through a pivoted mechanism 630 to the craft. The servo output member 329 is connected to an intermediate point of a pivoted arm 631 having one end pivoted at 632 to the craft. The opposite end 633 of arm 631 is connected through link 634 to one end of a conventional control stick 635 of the aircraft. From an intermediate point of arm 631 a further operating link 636 extends to a slidable control valve 637 of a boost servo 638 of the hydraulic type. The servo 638 additionally includes a cylinder assembly 639 and a piston assembly 640. The cylinder assembly 639 is connected through a link 641 to an operating arm 642 of the elevator control surface 643 of the aircraft to control attitude. The piston assembly 640 is connected to a pivoted mounting 644 on the craft. The motor 638 may be of the type wherein displacement of the valve 637 to effect operation of cylinder 639 relative to piston assembly 640 results in a follow-up action so that operation of the cylinder assembly 639 is proportional to the displacement of control valve 637 by link 636.

Associated with the link 634 connected to the control stick 635 is a pilot feel arrangement 645. The pilot feel device 645 comprises a member 646 secured to the link 634 and secured to an intermediate portion of a spring 647. The spring is carried in a channel shaper bracket 648 which may have a base member provided with a rack having teeth engaged with a pinion 649. The pinion 649 is driven by an output shaft 650 from the motor 605. By operation of motor 605, the spring member 647 is adjusted in the direction of movement of the link 634 to alter the normal bias position of control stick 635.

The apparatus of Figure 2 functions with the apparatus of Figures 1a, 1b in the following manner. Prior to automatic control through servomotor 325, the control column 635 may be operated to control operation of the servo 638 and thus that of surface 643 to change craft attitude and altitude. At this time, before the servomotor 325 is engaged, contactor 434, Figure 1b, engages contacts 432, 433 to provide a signal balancing the autopilot network 350 so that when automatic control is applied to the servomotor 325 by operation of the engage switch 305 there will be no autopilot network unbalance which if present would cause sudden operation of the control surface 643 from the autopilot servomotor 325.

Should the aircraft now be controlled by the autopilot for a considerable period, a mistrim in the craft may result for example tending for a sustained period to cause the front of the craft to nose upwardly or downwardly. Under these circumstances, the autopilot would control the servo-motor 325 which would result in a permanent displacement of the control surface 643 from its normal position in order to compensate in part for the mistrim of the craft. The operation of the servo 325 rotates the arm 631 to effect such displacement of the control surface 643. However, the operation of arm 631 through the link 634 also changes the normal position of the control stick 635 tending to store energy in the pilot feel device 645. Were the autopilot disengaged at this time, the pilot feel device 645 would move the control column 635 to an unoperated or normal position. However, this movement would result in movement of the control valve 637 of the boost 638 resulting in a sudden movement of the control surface 643 on disengagement of the autopilot.

In order to prevent such movement of the control column 635 and consequent movement of the control surface 643, the airplane trim switch arrangement 600, Figure 1b, controls the motor 605 which repositions the stick feel device 645 so that upon disengagement of the control system, the control column 635 does not move. Thus by operation of the motor 605, the position to achieve "no force" on the control stick 635 from the feel system 645 was effected. As thus adjusted by the servomotor, the control column 635 did not change its position when the servo 325 was operatively disengaged from the control surface operating means.

Mistrim compensation may be achieved by an auxiliary control surface. In Figure 3, the pilot control lever 635 is connected through link 634 and pivot 663 to an operable arm 655 mounted by pivot means 656 on its opposite end to the craft. Extending from an intermediate pivot point 658 on arm 655 is an operating link 659 for a control valve 660 of a boost system 661. The boost system includes the cylinder assembly 662 and a piston assembly 665. The cylinder assembly is connected to an operating arm 663 of the main control surface 664. The piston assembly is connected to a pivot 666 of arm 655 at a distance only slightly radially spaced from the pivot 656.

In the arrangement as described operation of the control stick 635 of the aircraft rocks arm 655 about pivot 656 causing link 659 to adjust control valve 660. The movement of the valve control rod 659 is permitted since the moment arm of connecting link 634 and crank arm 655 is much greater than that of the piston assembly 665 at pivot 666. The operation of the control valve 660 is also reflected in displacement of the cylinder assembly 662 which acts not only to position the surface 664 but as a follow-up movement for the control valve 660.

The hydraulic servomotor 325 has its cylinder assembly 326 connected to the craft at pivot mounting 668 whereas the piston assembly 329 is connected to pivot point 657 of the operable arm 655.

During automatic control of the craft, the servo 325 operates the arm 655 to position the control valve 660 with the movement of the cylinder assembly 662 through its movement relative to the control valve 660 terminating operation of the servomotor 661.

As in the case of manual operation, the operating point of the piston assembly 329 provides a greater moment arm on the pivoted arm 655 than is provided for the piston assembly of servomotor 661 on the same arm thereby operation of the servo 325 rotates the arm 655 with the cylinder assembly 662 and piston assembly 665 acting momentarily as an integral link to the main surface 664 prior to operation of boost servo.

During automatic control from the servomotor 325, if the aircraft changes trim or has applied thereto a continuing disturbing force tending to change craft attitude, a slight displacement of the surface would be required to offset the tendency to change trim or to offset the effect of the sustained disturbing force. Under this condition, the control column 635 is slightly displaced from its normal position.

Should the servomotor 325 now be operatively disengaged from the arm 655 by opening the energizing circuit for operating winding 475 of the pilot valve in servo 325, the aerodynamic reactive force on the displaced surface 664 would rotate the arm 655 either in one direction or the other depending upon the direction of craft mistrim in which circumstances the piston assembly 329 would offer no opposition. This movement of the main surface 664 would move the control stick 635 if the pilot did not anticipate such movement and be prepared to counter it.

To offset this tendency to change position of the main surface 664 and the control column 635 when the servomotor 325 is disengaged, the motor 605, Figure 1b may be operatively connected to a trim tab surface 668. During the time that the main surface is displaced to offset the out of trim condition, during which time the piston assembly 329 is displaced relative to the cylinder assembly 326, the arm 601 of the autopilot trim switch 600 is engaging either contact 602 or 603 to operate motor 605. The operation of motor 605 as applied to the trim tab surface 668 rotates it relative to the main surface 664 in a direction opposite to the rotation given to surface 664 by the boost servo 661. The displaced trim tab has applied thereto an aerodynamic load which will enable it to maintain the main surface 664 in the displaced position wherein it compensates for the out of trim condition. The hydraulic servomotor 325 has the fluid pressure equalized on opposite sides of the ram so that the autopilot trim switch contactor 601 is centralized between space contact 602 and 603 by restoring springs.

Since the trim tab 668 is compensating for the aerodynamic load on main surface 664, operative disconnection of the autopilot servomotor 325 from the arm 655 would not at this time result in a change of the position of main surface 664 and neither would there be a tendency to change the position of the pilot's control sticks 635.

Thus in neither the arrangement of Figure 2 nor that of Figure 3 does the manual controller 635 nor the main control surface change in position upon disengagement of the automatic control from the control means for the boost servo-motor of the main surface.

It will now be appreciated that there has been provided an arrangement for the novel utilization of a single trim actuator motor, one utilization being for synchronizing an autopilot system to an attitude of an aircraft prior to application of control of such aircraft by such autopilot system, and the second utilization provides for the motor operation after engagement of the autopilot system with the aircraft to condition or synchronize operating means associated with the control stick of the craft in accordance with the aerodynamic loading on a main control surface during autopilot control of the main surface.

As many changes could be made in the above arrangement and many apparently widely different embodiments of the invention could be made without departing from the scope thereof it is intended that all matter contained in the above description or shown in the accompanying drawing shall be considered as illustrative of the invention and not in a limiting sense.

What is claimed is:

1. In an automatic pilot on aircraft having a main control surface and a trim tab surface: a first hydraulic servomotor for controlling the main surface; a second hydraulic servomotor for controlling said trim tab surface; a control valve operating the two hydraulic servomotors in parallel; first means controlled by the second servomotor when it is displaced from a normal position operating said trim tab; second means controlled by the first servomotor operating the main surface; further valve means rendering said control valve effective or ineffective on said main surface servomotor; balanceable means operating said control valve; means controlled by said second servomotor to balance said balanceable means during manual operation of said main surface to change craft attitude; and selective means effective on balance of said balanceable means and connected to said further means for rendering said control valve effective on said main surface servomotor.

2. In an automatic pilot for an aircraft having a control surface means for changing craft attitude: a first hydraulic servomotor controlling the surface means; a second hydraulic servomotor; a control valve operating the first and second servomotors in parallel; balanceable means operating said control valve; position maintaining means for unbalancing said balanceable means; means operated by said second servomotor for rebalancing said balanceable means; further means rendering said control valve effective or ineffective on said first servomotor; selective means effective on balance of said balanceable means to cause the further means to render the control valve effective; means operatively connected to said second servomotor and indicative of continued displacement of said control surface from a normal position to remove the effect of such continued surface displacement from said first servomotor.

3. In an automatic pilot on aircraft having a control surface means for changing craft attitude and a control stick with a feel system controlling said control surface means; a first hydraulic servomotor also controlling the surface means; a second hydraulic servomotor; a control valve operating the first and second servomotors in parallel; balanceable means operating said control valve; position maintaining means for unbalancing said balanceable means; means operated by said second servomotor rebalancing said balanceable means; further means rendering said control valve effective or ineffective on said first servomotor; selective means effective on balance of said balanceable means to cause the further means to render the control valve effective; means indicative of continued displacement of said control surface from a normal position for altering the normal position of said feel system to remove the effect of such control surface displacement from said first servomotor.

4. In an automatic pilot on an aircraft having a control surface means for changing craft attitude and a control stick controlling said control surface means; a first hydraulic servomotor controlling the surface means; a second hydraulic servomotor; a control valve operating the first and second servomotors in parallel; balanceable means operating said control valve; position maintaining means for unbalancing said balanceable means; means operative by said second servomotor rebalancing said balanceable means; further means rendering said control valve effective or ineffective on said first servomotor; selective means effective on balance of said balanceable means to cause the further means to render the control valve effective; means indicative of continued displacement of said control surface from a normal position tending to move said control stick on rendering said first servomotor ineffective to remove the effect of such control surface displacement.

5. In an automatic pilot for an aircraft having a main control surface and a trim tab control surface, in combination: a balanceable means providing a signal responsive to craft deviation from a desired condition; a control means responsive to said balanceable means; a first hydraulic servomotor operating said main surface; a second hydraulic servomotor operating said trim tab surface; means for controlling both hydraulic servomotors from said control means whereby the second servomotor operates reversely of the first servomotor to reduce the loading on said main surface; means rendering said control means ineffective to control said first hydraulic servomotor; and means responsive to operation of said second hydraulic servomotor for rebalancing said balanceable means.

6. In an automatic pilot for an aircraft having a main control surface and a trim tab control surface, in combination: balanceable means responsive to craft deviation from a desired condition; control means responsive to said balanceable means; a first servomotor responsive to said control means for operation of the main surface to return the craft to the desired condition; a second servomotor responsive to said control means to position said trim tab surface; means for rendering said control means ineffective on said first servomotor; means operated by said second servomotor for rebalancing said control means while said control means is ineffective on said first servomotor.

7. In an automatic pilot for an aircraft having a main control surface and a trim tab control surface and manual means for positioning said main surface, in combination: balanceable means responsive to craft deviation from a desired condition; a control means responsive to said balanceable means; a first servomotor connected to said main control surface and responsive to said control means; a second servomotor connected to said trim tab surface and responsive to said control means; means for rendering said control means ineffective on said first servomotor during manual operation of said surface to change craft condition; and means operated by said second servomotor for balancing said balanceable means during change in said condition resulting from manual operation.

8. In an automatic pilot for an aircraft having a main control surface and trim tab surface, in combination: a balanceable means responsive to craft deviation from a desired condition; a first servomotor connected to said main control surface; a second servomotor connected to said trim tab surface; means operating both said servomotors from said balanceable means whereby said second servomotor operates in a different manner from said first servomotor means; means for rendering said balanceable means ineffective on said first servomotor means; and means responsive to said second servomotor means for rebalancing said balanceable means while said balanceable means is so ineffective.

9. Apparatus for selectively controlling the position of a craft in accordance with a signal and selectively permitting direct manual control of the craft position, comprising position maintaining means for detecting variations of position of said craft; a first servo means responsive to said reference means for maintaining said craft at a selected position; means for disabling said first servo means from controlling the attitude of said craft; a servo means responsive to said reference means for varying the attitude maintaining characteristics of said first servo means and position reference means in accordance with craft position variations during manual control for pre-conditioning said first servo means for the institution of servo control of said craft; and means responsive to said second servo means for relieving sustained loading on said first servo means resulting from a craft position permanently changed from said selected position.

10. Apparatus for aircraft having a main control surface and a manual controller controlling the position of said surface; said apparatus comprising: a first servo means operating said surface; an attitude responsive voltage providing device controlling said servo means; a second servo means for producing a voltage component to said device while said servo means is ineffective on said surface; and means controlled by said second servo means in accordance with the continued displacement of said first servo means from a normal position for varying the normal position of said manual controller.

11. An automatic pilot for an aircraft having a main control surface and a trim tab control surface, a hydraulic servomotor operating said main control surface, a second hydraulic servomotor controlling said trim tab surface; position responsive means for producing relatively large control signals corresponding to short period transient aircraft position errors and relatively small control signals corresponding to long period aircraft position errors, control means responsive to said signal means connected in parallel to said first and second hydraulic servomotor means whereby said first motor means is responsive to the short period signals and the second servomotor is responsive to the long period signals; means for rendering said control means ineffective on said first servomotor means; a means operated by said second hydraulic servomotor for balancing said signal means during non-operation of the first hydraulic servomotor.

12. In an automatic pilot for an aircraft having a main control surface and a trim tab control surface, position responsive means for producing relatively large control signals corresponding to short period aircraft position errors; control means responsive to said signals; a first servomotor means operating said main surface, follow-up means driven by said servomotor means for rebalancing said control means; a second servomotor means positioning said trim tab surface, means for controlling said trim tab servomotor means during change in position of said craft; a means for rendering said control means ineffective to operate said first servomotor means; and further means operated by said second servomotor means during non-operation of the first servomotor means for rebalancing said control means.

13. The apparatus of claim 12 in which said second servomotor means further operates a pair of switches to prevent control of said first motor means from said control means until said control means is in a balanced condition.

14. Control apparatus for an aircraft including a control column mounted to move about an axis and having elastic means for returning said column to unoperative position, in combination: servo means for operating a control surface of said craft; means for controlling said servo means from said control column; autopilot means responsive to craft change in position, a second servo means controlled by said autopilot means and operating said first servo means; a third servo means; means for rendering said elastic means responsive to said third servo means; means for rendering said autopilot ineffective to control said second servo means, and means for rebalancing said autopilot means from said third servo means during non-control of said second servo means by said autopilot means.

15. In a automatic pilot for an aircraft having a control surface means for changing craft attitude and a control stick controlling said control surface means; a first hydraulic servomotor simultaneously controlling the position of the control stick and control surface means; a second hydraulic servomotor; a control valve operating the first and second servomotors in parallel; balanceable means operating said control valve; flight condition sensing means unbalancing said balanceable means; means operative by said second servomotor rebalancing said balanceable means; further means rendering said control valve effective or ineffective on said first servomotor; selective means effective on balance of said balanceable means by said second servomotor to cause the further means to render said control valve effective on said first servomotor; and means indicative of continued displacement of said control surface from a normal position which tends to move said control stick on rendering said first servomotor ineffective, to remove the effect of such control surface displacement, said last named means comprising a control stick feel system opposing stick displacement from a normal position and responsive to persistent load on the displaced surface, to alter the normal stick position so that additional stick displacements from the altered position are opposed by said feel system.

16. In an automatic pilot for an aircraft having attitude changing means such as control surfaces: a first hydraulic servomotor simultaneously controlling the attitude changing means and control stick; a second hydraulic servomotor; a control valve operating the first and second servomotors in parallel; further means operating said control valve; means indicative of continued displacement of said control surface from a normal position, causing loading thereof which tends to move said control stick on rendering said first servomotor ineffective, to remove the effect of such control surface displacement, said last named means comprising a control stick feel system and adjusting means responsive to persistent loading on the displaced surface said adjusting means altering the normal position from which subsequent control stick displacement is opposed by said feel system.

References Cited in the file of this patent

UNITED STATES PATENTS

| | | |
|---|---|---|
| 2,045,579 | Carlson | June 30, 1936 |
| 2,143,139 | Carlson et al. | Jan. 10, 1939 |